(12) United States Patent
Gostein et al.

(10) Patent No.: US 10,886,876 B2
(45) Date of Patent: Jan. 5, 2021

(54) MEASURING SOILING AND NON-UNIFORM SOILING OF PV MODULES WITHOUT A CLEAN REFERENCE DEVICE

(71) Applicants: Michael Gostein, Austin, TX (US); William Stueve, Austin, TX (US)

(72) Inventors: Michael Gostein, Austin, TX (US); William Stueve, Austin, TX (US)

(*) Notice: Subject to any disclaimer, the term of this patent is extended or adjusted under 35 U.S.C. 154(b) by 0 days.

(21) Appl. No.: 16/895,356

(22) Filed: Jun. 8, 2020

(65) Prior Publication Data

US 2020/0304064 A1    Sep. 24, 2020

Related U.S. Application Data

(63) Continuation of application No. 16/289,779, filed on Mar. 1, 2019, now Pat. No. 10,715,081.

(60) Provisional application No. 62/637,204, filed on Mar. 1, 2018.

(51) Int. Cl.
    *G01J 1/42*     (2006.01)
    *H02S 50/00*    (2014.01)
    *G01N 21/94*    (2006.01)
    *G01N 21/59*    (2006.01)

(52) U.S. Cl.
    CPC ............ *H02S 50/00* (2013.01); *G01N 21/59* (2013.01); *G01N 21/94* (2013.01)

(58) Field of Classification Search
    CPC .... G01J 1/42; G01J 1/4214; G01J 1/44; G01J 1/1626; G01J 1/4228
    USPC ........................................................ 356/222
    See application file for complete search history.

(56) References Cited

U.S. PATENT DOCUMENTS

| | | | |
|---|---|---|---|
| 9,564,853 B2 | 2/2017 | Gostein |
| 9,800,202 B2 | 10/2017 | Gostein |
| 10,014,821 B2 | 7/2018 | Gostein |
| 10,171,029 B2 | 1/2019 | Gostein |
| 10,312,859 B2 | 6/2019 | Gostein |
| 2018/0278202 A1 | 9/2018 | Gostein |
| 2018/0331653 A1 | 11/2018 | Gostein |
| 2019/0273466 A1 | 9/2019 | Gostein |

*Primary Examiner* — Md M Rahman (57) ABSTRACT

A device or system to measure a soiling level and/or soiling level non-uniformity, or power loss arising from soiling including soiling non-uniformity, representative of a PV module. In one respect, a device comprising at least a first transparent window and at least two sensors, wherein said sensors comprise a soiling sensor, an irradiance sensor, or a photovoltaic device, and wherein at least two of said sensors are configured to measure separate regions of said first transparent window and at least one of said sensors is a soiling sensor configured to measure a soiling level of said first transparent window or of a second transparent window substantially close to said first transparent window, and wherein from said measurements of said sensors said device determines a soiling level and/or a non-uniformity of said soiling level of said first transparent window. In another respect, a device or system configured to determine from said measurements an equivalent power loss of a photovoltaic module having said soiling level with said non-uniformity. In another respect, a device or system comprising a photovoltaic module or an input for a photovoltaic module and configured to determine a power loss of said photovoltaic module due to soiling, including non-uniform soiling.

6 Claims, 8 Drawing Sheets

MEASURING SOILING AND NON-UNIFORM SOILING OF PV MODULES WITHOUT A CLEAN REFERENCE DEVICE

CROSS-REFERENCE TO RELATED APPLICATIONS

This application is a continuation of U.S. patent application Ser. No. 16/289,779, filed Mar. 1, 2019, which claims the benefit of U.S. Provisional Patent Application No. 62/637,204, filed Mar. 1, 2018, each of which is incorporated by reference herein in its entirety.

FIELD OF THE INVENTION

The disclosed subject matter is directed to the measurement of soiling of photovoltaic (PV) modules.

SUMMARY

Disclosed is a device to measure a soiling level and soiling level non-uniformity, or a power loss arising from soiling including soiling non-uniformity, representative of a PV module.

In one respect, disclosed is a device comprising at least a first transparent window and at least two sensors, wherein said sensors comprise a soiling sensor, an irradiance sensor, or a photovoltaic device, and wherein at least two of said sensors are configured to measure separate regions of said first transparent window and at least one of said sensors is a soiling sensor configured to measure a soiling level of said first transparent window or of a second transparent window substantially close to said first transparent window, and wherein from said measurements of said sensors said device determines a soiling level and a non-uniformity of said soiling level of said first transparent window.

In another respect, a disclosed device may be configured to determine from said measurements an equivalent power loss of a photovoltaic module having said soiling level with said non-uniformity.

In another respect, a disclosed device further comprises a photovoltaic module or an input for a photovoltaic module and is configured to determine a power loss of said photovoltaic module due to soiling including non-uniform soiling.

BRIEF DESCRIPTION OF THE DRAWINGS

In the figures, reference numbers of repeated elements are sometimes omitted for clarity.

DETAILED DESCRIPTION OF THE INVENTION

Solar panels, also known as photovoltaic (PV) modules, are used to convert sunlight to electric power in installations known as PV arrays. An important loss factor for a PV array is the accumulated deposition of airborne particulate matter on the light-receiving surfaces of the PV modules. This accumulation, known as soiling, reduces the power output of a PV array by blocking the transmission of sunlight to the PV cells of the PV modules.

In commercial electric power generation applications, which range from small ground-mounted and roof-mounted PV arrays to large utility-scale projects, owners and operators of PV arrays often wish to measure power losses due to soiling.

The soiling power loss is the difference between the actual output power of a PV module (or PV array) and its expected power under clean conditions. The soiling power loss may be expressed in various units or scales, including as a power, a fractional loss, a percentage loss, a ratio of actual to expected power, etc.

The soiling power loss is related to the soiling level of individual PV cells of PV modules. We define the soiling level as the localized loss in usable light transmission, or an average of this loss over an extended region. Again this loss may be expressed in various units or scales, including as a power, a fraction, a percentage, etc.

When soiling particles are distributed on a PV module uniformly, the soiling power loss may be equivalent to the average soiling level of the PV cells on the PV module.

However, when soiling particles are distributed on a PV module non-uniformly, the soiling power loss depends not only on the soiling level but also on the pattern of non-uniformity of the soiling level and the circuit model of the series and parallel connected PV cells of the PV module. This is described in "Comparing PV Power Plant Soiling Measurements Extracted from PV Module Irradiance and Power Measurements," by Gostein et al, 39$^{th}$ IEEE Photovoltaics Specialists Conference (PVSC), Tampa, Fla., 2013, which is hereby incorporated herein by reference in its entirety. The effect of non-uniformity may be significant.

Non-uniform soiling occurs frequently in actual installations. Often precipitation and gravity combine to cause soiling particles to concentrate on the lower edges of PV modules. Concentrations of soiling particles may also appear at other edges and corners of PV modules, for example due to wind and other effects.

In some embodiments, a device is disclosed that is configured to measure a soiling level or average soiling level and/or a soiling level non-uniformity characteristic of a PV module or PV array. Soiling level non-uniformity may be expressed in various units or scales, including as a fractional or percentage deviation from an average level or from a level at a specific point, as a maximum and/or minimum excursion from an average or specific level, or in terms of PV module power loss caused by soiling including soiling non-uniformity.

In some embodiments, a soiling level non-uniformity measurement device is disclosed that does not require routine cleaning of a reference device to perform its measurement.

In some embodiments, a soiling sensor measures a local soiling level, without requiring comparison with a clean reference device. Various methods exist to implement such a sensor. In one embodiment, said soiling sensor may be implemented as described in U.S. patent application Ser. No. 15/877,351, filed on Jan. 22, 2018, which is hereby incorporated herein by reference in its entirety. In another embodiment, said soiling sensor may be implemented as described in U.S. patent application Ser. No. 15/877,207, filed on Jan. 22, 2018, which is hereby incorporated herein by reference in its entirety. In still other embodiments, said soiling sensor may be implemented in other ways, including any sensor that detects the absolute or relative amount of light transmission loss due to dust or particulate matter on a surface of the device within a local region, using optical, electrical, acoustic, or other principles.

In some embodiments, a device according to the disclosed subject matter may be installed within or in close proximity to a PV array or at the site of prospective PV array. The soiling level and non-uniformity detected on the device itself may be assumed to be characteristic of those on the PV array or prospective PV array. Since the accumulation of soiling particles can depend on orientation, especially tilt angle, the device may be typically installed in the same plane (same azimuth and tilt angle) as an actual or prospective PV array. In some embodiments, the device mounts onto a PV array mounting structure or onto a PV module within a PV array, especially in embodiments where a PV array is a tracking system that moves throughout the day to track the sun.

Figure 1:
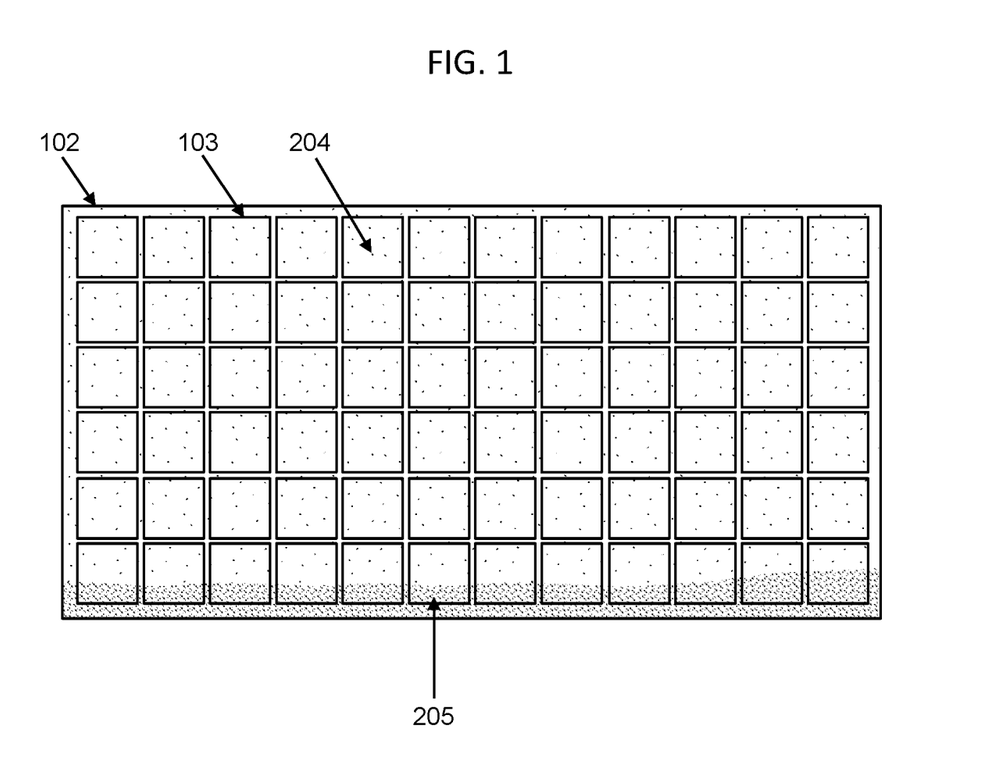
FIG. 1 depicts an exemplary PV module with non-uniform soiling, in a landscape orientation.

FIG. 1 depicts an exemplary PV module (102) with non-uniform soiling. The exemplary PV module (102) is comprised of 72 PV cells (103) and is shown in an exemplary orientation with its long edge down, conventionally described as "landscape" orientation. Soiling particles (204) cover its surface and there is a region of concentrated soiling particles (205) along its bottom edge. PV module (102) may in general have different numbers of PV cells (103), which may be arranged differently, and may be mounted in various orientations.

Figure 2:
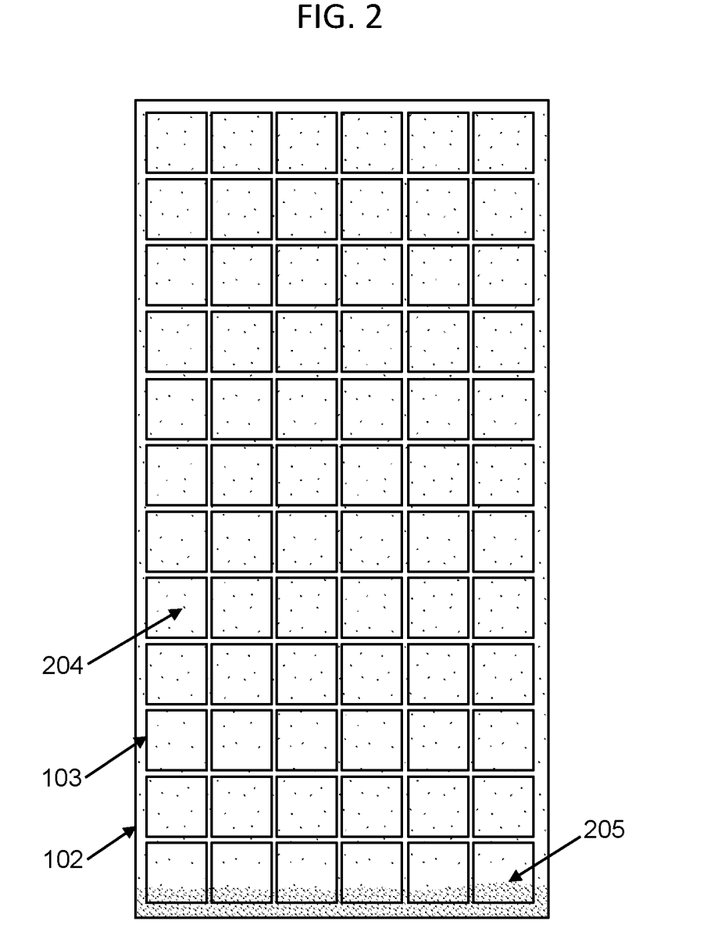
FIG. 2 depicts an exemplary PV module with non-uniform soiling, in a portrait orientation.

FIG. 2 depicts an exemplary PV module (102) with 72 PV cells (103) with non-uniform soiling, similar to that of FIG. 1, but in an orientation with its short edge down, conventionally described as "portrait" orientation. Soiling particles (204) cover its surface and there is a region of concentrated soiling particles (205) along its bottom edge.

Figure 3A:
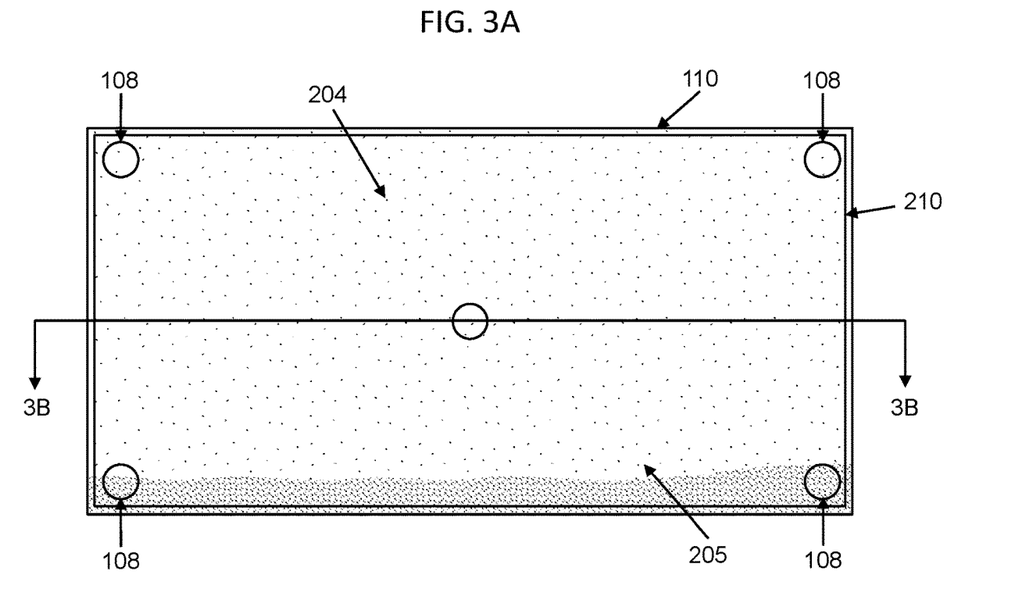
FIG. 3A depicts a top view of an embodiment according to one aspect of the disclosure, with five soiling sensors distributed under a transparent window of similar size to the PV module depicted in FIG. 1.
Figure 3B:
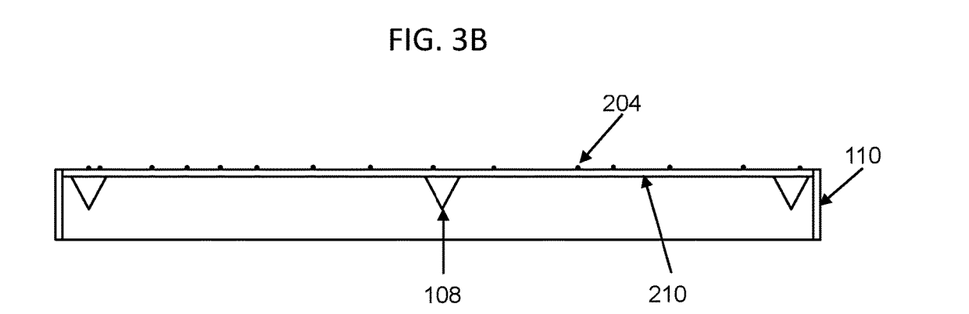
FIG. 3B depicts a side view of the embodiment of FIG. 3A.

FIG. 3A and FIG. 3B depict an example embodiment in accordance with one aspect of the disclosure. A transparent window (210) may be housed in a frame or enclosure (110). The size of transparent window (210) and frame or enclosure (110) may be chosen to be similar to the size of a PV module (102) whose soiling power loss is to be estimated. Transparent window (210) may be comprised of a single sheet of material, such as glass, in order to best represent the dynamics of soiling particle (204) deposition and redistribution on a PV module (102) under the effects of precipitation, gravity, wind, etc. Soiling particles (204) cover the surface of transparent window (210) and there may be a region of concentrated soiling particles (205) along its bottom edge. In the example embodiment depicted, five soiling sensors (108), are distributed to measure different portions of transparent window (210), for example at the center and corners. By analyzing measurements of multiple soiling sensors (108) distributed across transparent window (210), a characteristic soiling level and soiling level non-uniformity may be determined. Soiling sensors (108) may be preferentially positioned to capture extremes of soiling level. A computing element (301) may collect and analyze measurements of soiling sensors (108) and calculate results.

Figure 4A:
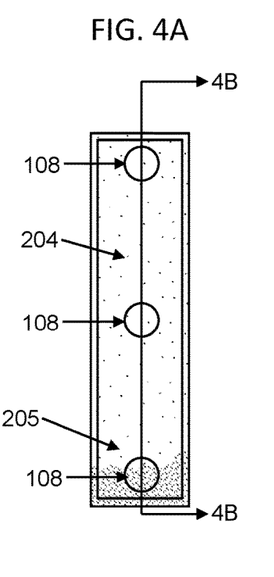
FIG. 4A depicts a top view of an embodiment similar to that of FIG. 3A, but with three soiling sensors distributed under a transparent window whose height is similar to the height of the PV module depicted in FIG. 1.
Figure 4B:
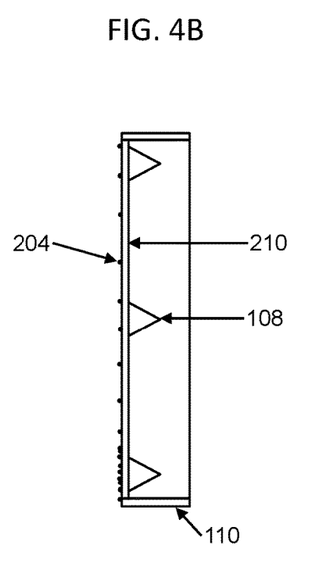
FIG. 4B depicts a side view of the embodiment of FIG. 4A.
Figure 4C:
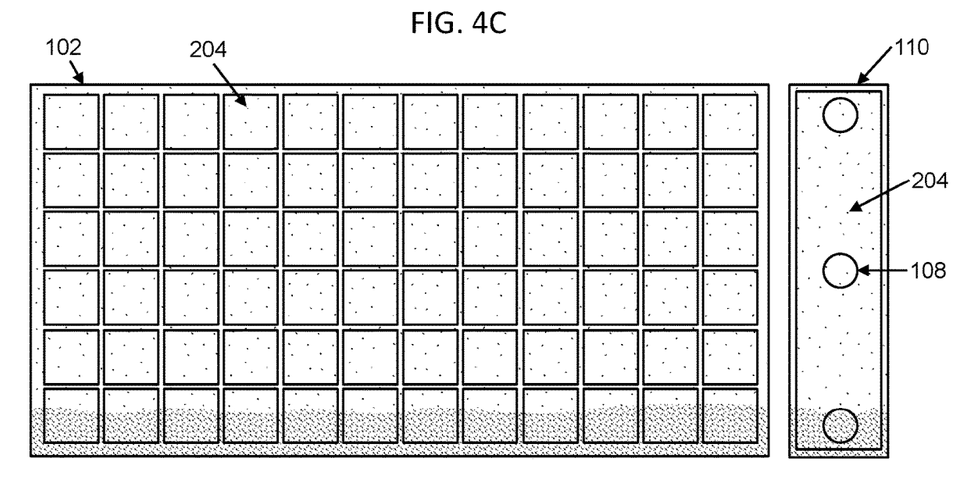
FIG. 4C depicts the embodiment of FIG. 4A installed next to the exemplary PV module depicted in FIG. 1.

FIG. 4A and FIG. 4B depict another example embodiment, configured to primarily measure soiling level non-uniformities along a vertical dimension. In contrast to an embodiment depicted in FIG. 3A and FIG. 3B, only three soiling sensors (108) are depicted and the horizontal dimension of transparent window (210) and frame or enclosure (110) are chosen to be narrower than that of PV module (102) whose performance is to be estimated, while the vertical dimensions are chosen to be substantially similar to those of PV module (102), such that the vertical distribution of soiling particles (204) is similar to that of representative PV module (102). FIG. 4C depicts a device according to an embodiment of FIG. 4A and FIG. 4B installed next to a PV module (102). Such embodiments can be deployed with smaller space requirements than those of FIGS. 3A and 3B that approximate a full-size PV module (102). Similar alternative embodiments follow a horizontal layout rather than a vertical one.

Figure 5A:
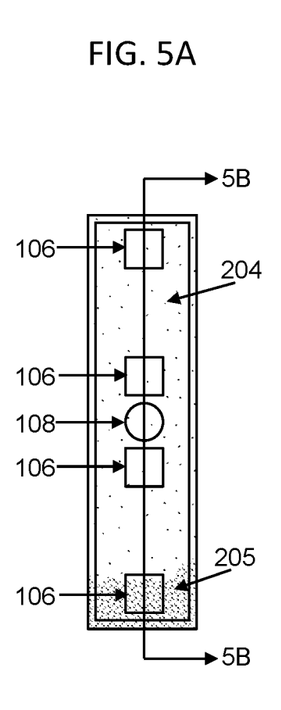
FIG. 5A depicts a top view of an embodiment according to another aspect of the disclosure, with one soiling sensor and four irradiance sensors distributed under a transparent window.
Figure 5B:
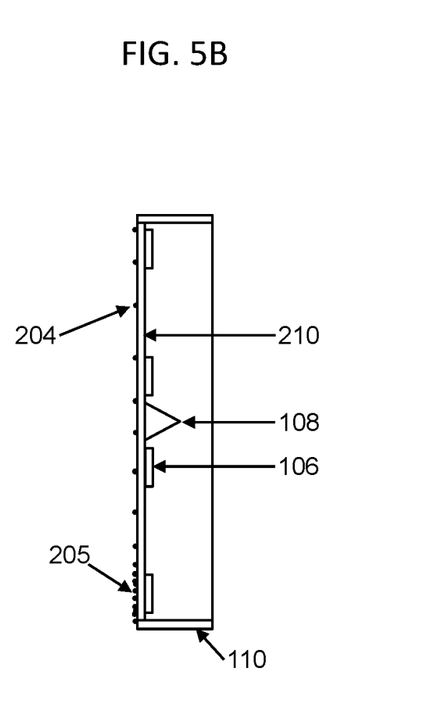
FIG. 5B depicts a side view of the embodiment depicted in FIG. 5A.

FIG. 5A and FIG. 5B depict an example embodiment in accordance with another aspect of the disclosure. A single soiling sensor (108) measures a soiling level in the center of transparent window (210). Four optical sensors, configured as irradiance sensors (106), measure the irradiance received through transparent window (210) at multiple positions. Irradiance sensors (106) may comprise, for example, PV reference cells or photodiodes. The middle two positions of irradiance sensors (106) are substantially close to the single soiling sensor (108) such that they are assumed to have the same soiling level. By comparing the irradiance readings of remaining irradiance sensors (106) with those of irradiance sensors (106) near the center, soiling non-uniformity is determined and the soiling level at each of the irradiance sensors (106) can be determined by reference to those irradiance sensors (106) located near soiling sensor (108) in the center. Embodiments such as depicted in FIG. 5A and FIG. 5B may result in lower cost as irradiance sensors (106) may be less expensive than soiling sensors (108).

In other related embodiments, multiple transparent windows (210) may be employed, meaning that one or more soiling sensors (108) may be directed to one or more transparent windows (210) while one or more irradiance sensors (106) may be directed to one or more separate transparent windows (210). When at least one soiling sensor (108) is positioned substantially close to at least one irradiance sensor (106), such that their soiling levels are assumed to be equal, readings of said soiling sensors (108) may be used to correct readings of said irradiance sensors (106) and a soiling level and soiling level non-uniformity may be thereby determined. Such embodiments may result in lower cost due to the flexibility of construction.

Embodiments depicted show exemplary numbers and arrangements of soiling sensors (108) and irradiance sensors (106). However, in other embodiments, different numbers and arrangements may be used. In some embodiments, providing at least two soiling sensors (108) may allow determination of a soiling level and a soiling non-uniformity. In some embodiments, providing at least one soiling sensor (108) and at least two irradiance sensors (106), one of which is positioned next to or substantially close to a soiling sensor (108), may allow determination of a soiling level and a soiling non-uniformity.

Embodiments depicted show exemplary sizes of transparent window (210) and enclosure (110) in relation to an exemplary PV module (102) whose soiling is to be estimated, deployed in an exemplary landscape orientation. However, in other embodiments, other relative sizes and orientations may be used. In some embodiments, size and orientation are chosen according to best represent a specific type or category of PV module (102) and installation orientation. In other embodiments, size is chosen larger or smaller than a PV module (102) whose performance is to be estimated, and analysis takes into account any size and/or orientation difference. In some embodiments, a large number of optical sensors are included and analysis is based on selectively using an arrangement of sensors that best represents PV module (102) whose performance is to be estimated.

In some embodiments, a computing element (301) reports an estimated power loss for a representative PV module (102) based on analysis of readings from soiling sensors (108) and/or irradiance sensors (106) with corresponding determination of a soiling level and a soiling level non-uniformity. In some embodiments, said analysis utilizes an electrical model, for example using SPICE, of a representative PV module (102) in order to estimate power loss. In some embodiments, said analysis uses a simplified parameterized version of an electrical model, according to which soiling power loss is determined as a function of soiling level parameters such as, for example, soiling levels at the center, top edge, and bottom edge of PV module (102).

Figure 6:
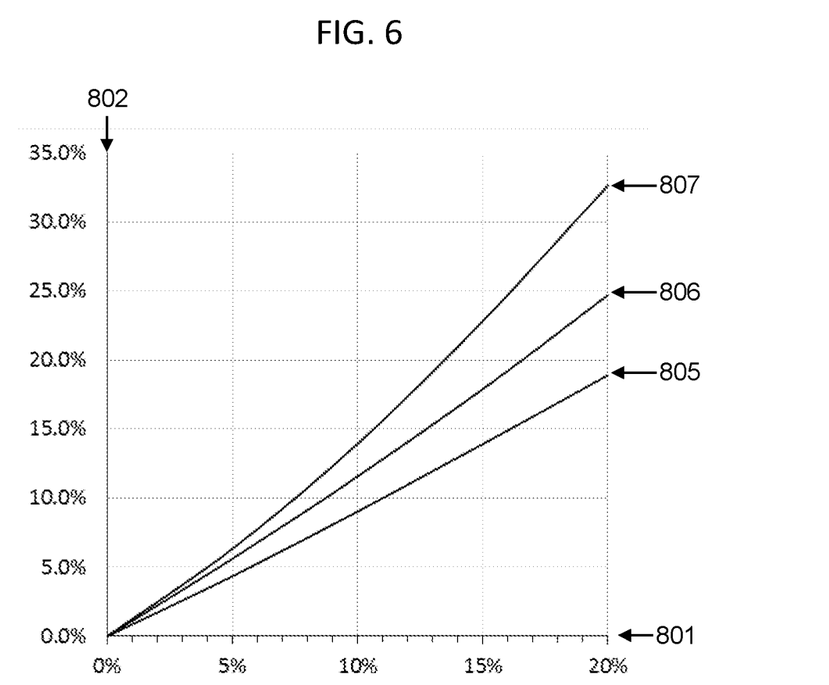
FIG. 6 depicts an exemplary parameterized model of the relation between soiling level, soiling non-uniformity, and PV module power loss, for an exemplary PV module similar to that depicted in FIG. 1.

FIG. 6 depicts exemplary results of a parameterized model of a relation between soiling level, soiling non-uniformity, and PV module power loss, for an exemplary PV module (102) with exemplary soiling similar to that depicted in FIG. 1. Horizontal axis (801) represents the soiling level in the center of PV module (102), outside the region of concentrated soiling particles (205). Vertical axis (802) represents the soiling power loss of PV module (102). Three curves (805), (806), and (807) represent the relation between soiling power loss and center soiling level, for cases where the soiling level in region of concentrated soiling particles (205) equals a multiple of 1, 1.5, or 2, respectively, relative to the center. In some embodiments, a pre-determined parameterized model such as depicted in FIG. 6 may be used to simplify analysis within the disclosed device.

In some embodiments according to another aspect of the disclosure, the power output and/or the I-V characteristic curve (from which power output may be determined) of a PV module (102) are also directly measured by an I-V measurement circuit (311). Such embodiments are described further below.

Figure 7:
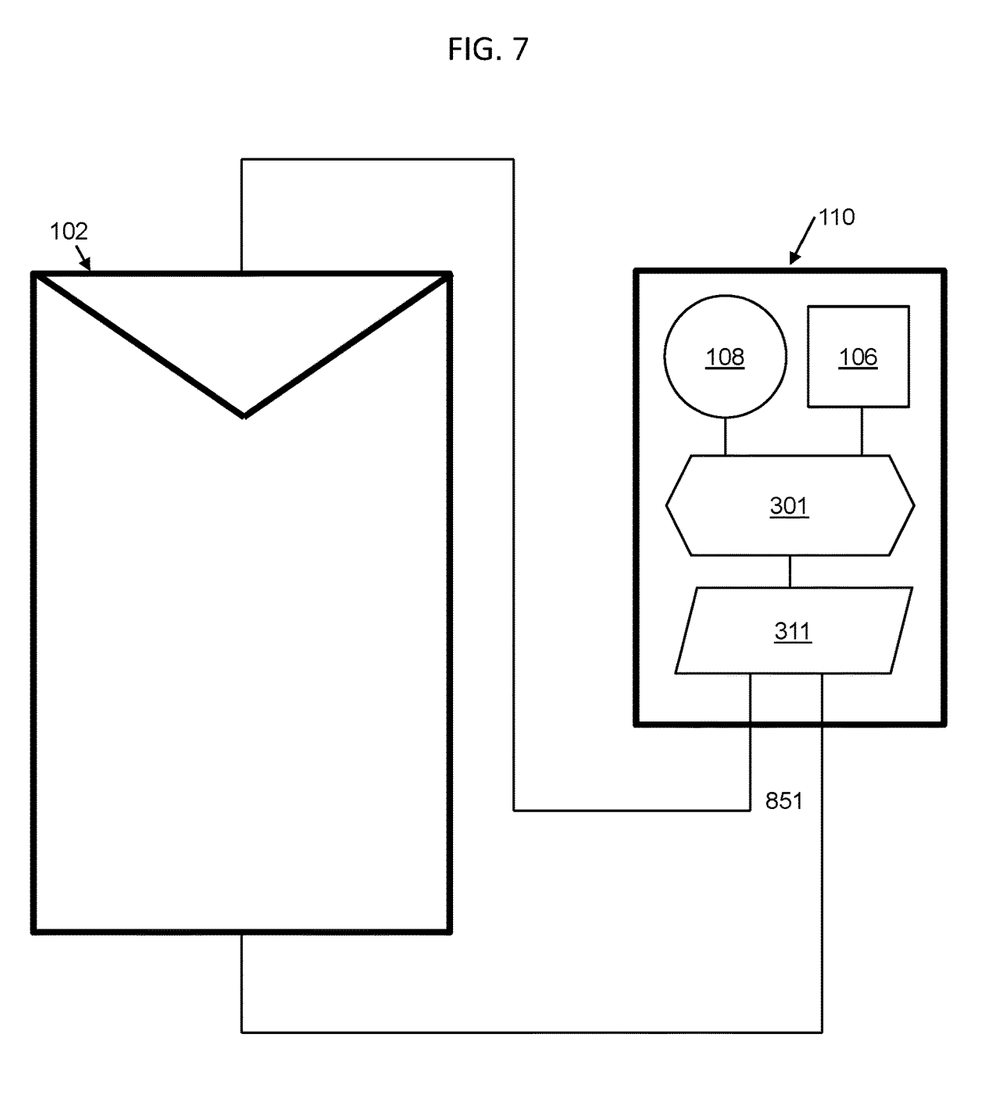
FIG. 7 depicts, schematically, a device according to one or more aspects of the disclosure, in which a computing element analyzes one or more soiling sensors, irradiance sensors, and/or PV modules.

FIG. 7 depicts, schematically, a device or system according to one or more aspects of the disclosure, in which a computing element (301) analyzes one or more soiling sensors (108), irradiance sensors (106), and/or PV modules (102) connected by cables (851) and measured by I-V measurement circuits (311), wherein the foregoing elements may be combined in different number and arrangement according to various aspects of the disclosure. Soiling sensors (108), irradiance sensors (106), and/or I-V measurement circuits (311) may be housed in one or more enclosures.

Figure 8:
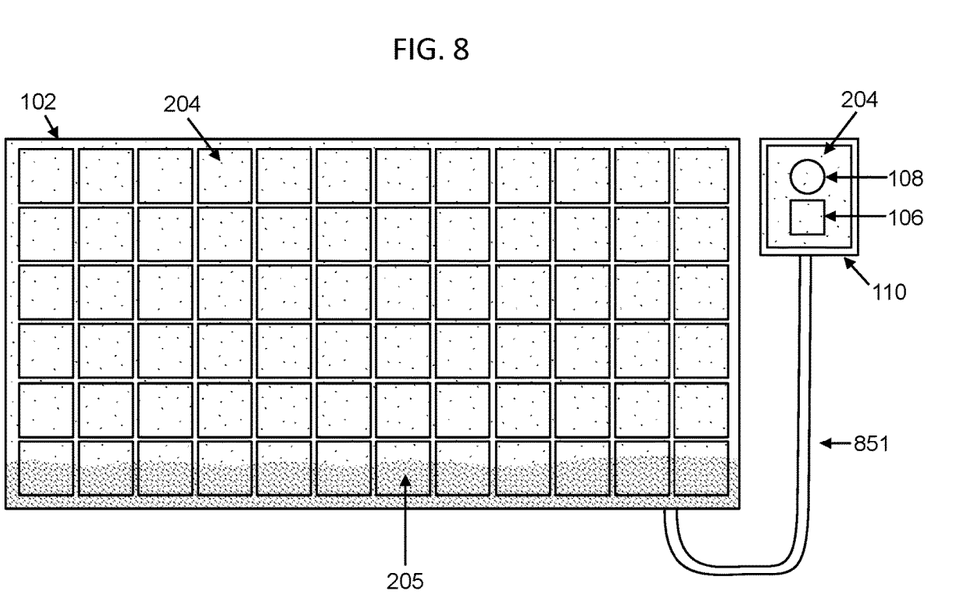
FIG. 8 depicts the device of FIG. 7 installed next to an exemplary PV module such as depicted in FIG. 1.

FIG. 8 depicts an example embodiment according to one aspect of the disclosure, in which the actual power output of a representative PV module (102) is determined and compared with expectations in order to determine soiling power loss. In such embodiments we may consider the cover of representative PV module (102) may serve as a transparent window (210) and the cells of PV module (102) may serve as irradiance sensors directed to said transparent window (210) but wired electrically together. A soiling sensor (108) and optional separate irradiance sensor (106) are mounted next to representative PV module (102) in an enclosure, which also houses I-V measurement circuit (311) (depicted in FIG. 7). Representative PV module (102) is connected to the device via PV module leads and cables (851). I-V measurement circuit (311) determines the maximum power output of PV module (102), for example by performing an I-V (current vs. voltage) sweep, maximum power point tracking, or through other means. Soiling sensor (108) and irradiance sensor (106) are substantially close such that they have similar soiling level, and therefore soiling sensor (108) is used to estimate soiling on irradiance sensor (106) due to soiling particles (204) and readings of irradiance sensor (106) are then corrected for soiling to determine an accurate irradiance. Based at least upon this accurate irradiance, and optionally upon a measured PV module temperature, as well as stored constants for PV module (102), an expected clean-state power output of PV module (102) is calculated. The actual measured power output is compared with the expected clean-state power and the difference or ratio are used to determine the soiling power loss, which includes the effects of any non-uniform soiling due to concentrated soiling particles (205). In some embodiments, a temperature of PV module (102) may also be measured and measurements of PV module (102) short-circuit current or power may be temperature-corrected.

In one embodiment similar to that depicted in FIG. 8, irradiance sensor (106) may be omitted and irradiance may be determined from another irradiance sensing element incorporated within soiling sensor (108) or within a separate device or system, or from other estimates. By combination with the results of soiling sensor (108), soiling level and/or non-uniformity and/or their effect on power loss of PV module (102) are determined.

In one embodiment similar to that depicted in FIG. 8, irradiance sensor (106) may be omitted and irradiance may be determined from PV module (102) short-circuit current and/or maximum power output, in conjunction with soiling level measurements from soiling sensor (108), together with a model that quantifies how PV module (102) short-circuit current and power output vary with uniform and non-uniform soiling. By combination with the results of soiling sensor (108), soiling level and/or non-uniformity and/or their effect on power loss of PV module (102) are determined.

In some embodiments similar to that depicted in FIG. 8, a customer or user supplies PV module (102), and therefore the disclosed device is one that enables the disclosed measurements to be performed using the user-supplied PV module (102).

Although this disclosure is directed to the application of measuring soiling of photovoltaic modules and photovoltaic arrays, it will be understood by those skilled in the art that the disclosed subject matter has other applications, including detection of soiling and fouling of glass and other optics in other areas of commerce and industry, and these additional applications are intended to be within the scope of this disclosure.

The invention claimed is:

1. A device comprising
    a sensor configured as a soiling sensor,
    a separate input for a photovoltaic module,
    an I-V measurement circuit connected to said input that measures at least a power output of said photovoltaic module, and
    a computing element,
    wherein said soiling sensor measures a soiling level,
    and wherein from said measurement by said soiling sensor of said soiling level and from said measurement by said I-V measurement circuit of said power output, said device determines a power loss of said photovoltaic module due to soiling including non-uniform soiling.

2. The device of claim 1, wherein said power loss is expressed as a power, a fractional loss, or a ratio of actual to expected power.

3. The device of claim 1, further comprising a temperature sensor measuring a temperature of said photovoltaic module, and wherein from said temperature measurement said computing element corrects measurements by said I-V measurement circuit.

4. The device of claim 1, further comprising an irradiance sensor with substantially similar soiling as said soiling sensor, wherein, from said measurement by said soiling sensor of said soiling level, said device corrects readings of said irradiance sensor for soiling to determine an accurate irradiance, and wherein from said accurate irradiance and from said measurement by said I-V measurement circuit of said power output, said device determines a power loss of said photovoltaic module due to soiling including non-uniform soiling.

5. The device of claim 4, wherein said irradiance sensor is incorporated within said soiling sensor or is substantially close to said soiling sensor.

6. The device of claim 4, wherein said irradiance sensor is part of a separate device or system.

* * * * *